US 7,054,319 B2

(12) United States Patent
Akahane et al.

(10) Patent No.: US 7,054,319 B2
(45) Date of Patent: May 30, 2006

(54) VPN ROUTER AND VPN IDENTIFICATION METHOD BY USING LOGICAL CHANNEL IDENTIFIERS

(75) Inventors: Shinichi Akahane, Tokyo (JP); Kenichi Sakamoto, Tokyo (JP); Kazuo Sugai, Ebina (JP)

(73) Assignee: Hitachi, Ltd., Tokyo (JP)

( * ) Notice: Subject to any disclaimer, the term of this patent is extended or adjusted under 35 U.S.C. 154(b) by 708 days.

(21) Appl. No.: 09/811,440

(22) Filed: Mar. 20, 2001

(65) Prior Publication Data

US 2001/0050914 A1  Dec. 13, 2001

(30) Foreign Application Priority Data

Jun. 2, 2000  (JP)  .............................. 2000-170414

(51) Int. Cl.
*H04L 12/28* (2006.01)
*H04L 12/56* (2006.01)

(52) U.S. Cl. .................... 370/395.53; 370/395.52; 370/395.1; 370/395.31; 370/395.32; 370/466; 370/467; 370/401; 370/410; 370/409; 370/392; 709/242

(58) Field of Classification Search ............... 370/401, 370/392, 389, 469, 395.52, 466, 409, 410, 370/395.1, 394, 395.53, 356, 357, 355, 390, 370/395.31, 395.32, 467, 242; 709/249, 709/203, 238, 239, 245, 242
See application file for complete search history.

(56) References Cited

U.S. PATENT DOCUMENTS

| 6,594,704 | B1 * | 7/2003 | Birenback et al. | ........... 709/238 |
| 6,614,791 | B1 * | 9/2003 | Luciani et al. | .......... 370/395.53 |
| 6,633,571 | B1 * | 10/2003 | Sakamoto et al. | ........... 370/401 |
| 6,636,516 | B1 * | 10/2003 | Yamano | ................ 370/395.52 |
| 6,751,191 | B1 * | 6/2004 | Kanekar et al. | ............ 370/217 |
| 6,751,220 | B1 * | 6/2004 | Li | ............................... 370/390 |
| 6,771,662 | B1 * | 8/2004 | Miki et al. | ................... 370/469 |
| 6,788,681 | B1 * | 9/2004 | Hurren et al. | ............... 370/389 |
| 6,879,680 | B1 * | 4/2005 | Donovan et al. | ...... 379/220.01 |
| 6,956,858 | B1 * | 10/2005 | Hariguchi et al. | ...... 370/395.31 |
| 2004/0008706 | A1 * | 1/2004 | Sakamoto et al. | ........... 370/401 |
| 2004/0095947 | A1 * | 5/2004 | Luciani et al. | .............. 370/410 |

FOREIGN PATENT DOCUMENTS

| EP | 0 952 755 A2 | 10/1999 |
| JP | 2000-174805 | 6/2000 |

OTHER PUBLICATIONS

Patent Abstracts of Japan 2000-174805.
Nikkei Communications, pp. 6-7, 95-101, Oct. 1999.

* cited by examiner

*Primary Examiner*—Wellington Chin
*Assistant Examiner*—Chuong Ho
(74) *Attorney, Agent, or Firm*—Mattingly, Stanger, Malur & Brundidge, P.C.

(57) ABSTRACT

A VPN edge router with the ability of identifying VPNs by using the identifiers of logical channels multiplexed on a single input line.

15 Claims, 15 Drawing Sheets

| Physical Interface Number (200) | Lower Layer Protocol (203) | VPN ID (202, 201, 204) | | |
|---|---|---|---|---|
| 1 | ATM | VPI, VCI | | CLP |
| 2 | ATM | VPI, VCI | | CLP |
| 3 | ATM | Physical Interface Number | | CLP |
| 4 | Frame Relay | DLCI | | |
| 4 | PPP | Time Slot Number | | |
| ⋮ | ⋮ | ⋮ | | ⋮ |

← Keys → ← Results →

Fig.6

| Physical Interface Number | Lower Layer Protocol | VPN ID | |
|---|---|---|---|
| 1 | ATM | VPI, VCI | CLP |
| 2 | ATM | VPI, VCI | CLP |
| 3 | ATM | Physical Interface Number | CLP |
| 4 | Frame Relay | DLCI | |
| 4 | PPP | Time Slot Number | |
| ⋮ | ⋮ | ⋮ | ⋮ |

←——— Keys ———×——— Results ———→

Fig.7A

| VPN ID | | VPN Number | |
|---|---|---|---|
| VPI, VCI | CLP | VPN Number | Internal Priority Information |
| a | 0 | VPNA | a |
| a | 1 | VPNA | b |
| b | 0 | VPNB | c |
| b | 1 | VPNB | d |
| ⋮ | ⋮ | ⋮ | ⋮ |

← Keys ⟶⟵ Results →

Fig.7B

| VPN ID | VPN Number | |
|---|---|---|
| Physical Interface Number | VPN Number | Internal Priority Information |
| 3 | VPNA | a |
| ⋮ | ⋮ | ⋮ |
| n | VPNB | b |
| ⋮ | ⋮ | ⋮ |

← Keys ⟶⟵ Results →

| Destination IP Address | Output Direction Number | Output Encapsulation Header Information |
|---|---|---|
| a. a. a. a | 10 | a |
| b. b. b. b | 11 | b |
| ⋮ | ⋮ | ⋮ |
| n. n. n. n | 15 | n |

← Keys ✕ Results →

VPN ROUTER AND VPN IDENTIFICATION METHOD BY USING LOGICAL CHANNEL IDENTIFIERS

BACKGROUND OF THE INVENTION

1. Field of the Invention

The present invention relates to routers, particularly, a router that interconnects Virtual Private Networks (VPNs) to build a network system via the Internet, a method of packet forwarding control to be used on the router, and a method of registering routing and related settings with the router.

2. Description of Related Art

When networking a plurality of intra-corporation networks existing in different areas, corporations conventionally used private lines to interconnect these networks, thus forming a network system that is isolated from external networks (to ensure network security). This, however, posed a problem that the use of private lines increases the networking cost. As a result, along with the prevalence of the Internet that can be used at a low charge, there have been increasing needs for an art of forming a low-cost Virtual Private Network (hereinafter referred to as VPN) by using the Internet. This art is to virtually build private networks via the Internet by using the Internet Protocol (IP) facilities provided by IP networks and the facilities of lower layer protocols below IP. This art enables building a safe network that is isolated from external networks and can provide quality assurance service of any level even via the Internet.

One implementation method of reliable data transmission across a VPN is such that data encapsulation is performed at the entrance to a network of an Internet service provider (hereinafter referred to as ISP) that provides the VPN. The encapsulated data is transferred across the ISP's network, according to the capsule header, and this header is removed at the exit of the network. By using VPN-specific encapsulation headers for datagrams that pass across the Internet, VPNs with ensured security can be formed. Practically used encapsulation protocols are IP capsule, Multi Protocol Over ATM (MPOA), Multi Protocol Label Switching (MPLS), and other ones. The Internet Engineering Task Force (IETF) and other organizations for standardization are working toward the standardization of the encapsulation protocols as of May 2000.

IP addresses are divided into global IP addresses and private IP addresses. Global IP addresses are globally defined unique addresses, whereas private IP addresses can be freely defined by a corporation. Private IP addresses are often used in intra-corporation networks. Thus, it is desirable that private IP addresses can be used when corporations use VPN service. If there are a plurality of VPNs and private IP addresses are used in the VPNs, it may happen that an IP address used in one VPN is also used in another VPN. If IP address duplication exists among a plurality of VPNs, a router that is placed at the entrance to the ISP network and interconnects Local Area Networks (LANs) belonging to the VPNs (this router is hereinafter referred to as a VPN edge router) must hold routing tables separately created for the VPNs in order to properly forward packets across the VPNs. Upon the reception of a packet, the VPN edge router finds one of the VPNs to which one of the LANs belongs across which the packet passed. Then, the VPN edge router searches the routing table for the thus found VPN, determines the forwarded-to-destination of the packet across the ISP network, and encapsulates the packet. Because the VPN edge router holds the routing tables separately created for the VPNs, even if it receives packets passed across different VPNs, but having a same destination IP address, it can forward the packets to their correct destinations without mistaking one for another.

As a method of identifying the above VPNs, for example, the method is known in which a VPN ID is assigned to a user line interface for unique VPN identification and VPN identification is performed by VPN ID, as described in the Oct. 18, 1999, issue of "Nikkei Communication," p. 100. According to this method, VPN identification is performed on a physical interface by interface basis, wherein correspondence of one physical interface to one VPN is required.

In the above method, however, it is required that one physical line connects a corporate network to the ISP network. In order to connect one corporate network to a plurality of VPNs, as many physical lines as the number of the VPNs must be prepared. At the same time, the VPN edge router that interconnects the VPNs must have as many physical interfaces as the number of the VPNs. Consequently, a problem arises that expansion of VPNs interconnected by the VPN edge router expands the physical interfaces of the VPN edge router and eventually additional routers are required.

In a case where an ATM network or a frame relay network provided another ISP or carrier is used as intermediate access means from a corporate network to the ISP network that provides VPN service, a plurality of logical channels are multiplexed and terminated to one physical interface at the entrance of the ISP network. These multiplexed logical channels cannot be identified by VPN identification by physical interface and this is another problem due to the limitation of the previous VPN identification method.

SUMMARY OF THE INVENTION

An object of the present invention is to enable VPN identification by using the identifiers of logical channels multiplexed and terminated to a physical interface.

Another object of the present invention is to enable VPN identification by using different kinds of VPN identifiers proper for a plurality of different protocols that are used as lower layer protocols below IP predefined for LANs that are interconnected by the router.

In order to solve the above problems, the VPN edge router of the present invention identifies VPNs by using the identifiers of logical channels multiplexed and terminated to a physical interface. As the logical channel identifiers, information for lower layer protocols below IP is used; e.g., information equivalent to layer 2 prescribed in an OSI model. For example, the logical channel identifiers are expressed in combined VPI and VCI values specified in the header of packets if an ATM protocol is the lower layer protocol of the IP packets or DLCI values if a frame relay is the lower layer protocol. Furthermore, if IP packets are encapsulated with an L2TP header prescribed by a Layer2 Tunneling Protocol (L2TP), information (such as tunnel ID and session ID) specified in the L2TP header can be used as logical channel identifiers. If the lower layer is an Ethernet and VPN identification is performed by using VLAN Tag prescribed in IEEE802.1 Q, VLAN Tag is used as logical channel identifiers. If IP packets are encapsulated with a capsule header prescribed by a PPP Over Ethernet encapsulation protocol, information (such as session ID) specified in the capsule header prescribed by the above protocol is used as logical channel identifiers.

Furthermore, the VPN edge router holds a VPN ID indication table into which what kinds of VPN identifiers are used for VPN identification are registered. To allow the ISP network administrator, who administrates the VPN edge router to register VPN identifier settings into this table, the VPN edge router is provided with a user interface. Assume the ATM protocol to be the lower layer below IP as an example. If physical interfaces are used for VPN identification, a "physical interface number" is set in the above VPN ID indication table. If "VPI, VCII" values are used for VPN identification, a "VPI, VCI" value is set in this table.

The VPN ID indication table may contain settings for all physical interfaces or settings for all interface cards, each of which may accommodate a plurality of lines under a same lower layer protocol. If a plurality of logical channels under different lower layer protocols are multiplexed and terminated to one physical interface (for example, a frame relay channel and a PPP channel are multiplexed on a line by time division), the VPN ID indication table may contain settings for all combinations of a physical interface and a lower layer protocol below IP.

How the VPN edge router actually operates will be explained below, using the case where the ATM protocol is used as the lower layer below IP for VPNs interconnected via the ISP network and VPN identifiers are expressed in "VPI, VCI" values as an example. When the VFN edge router receives a packet, it first determines the VPN identifier type, according to the setting (in this example, "VPI, VCI") in the VPN ID indication table, and determines what VPN identification table is to be searched next. In this example, the VPN edge router next searches the VPN identification table that maps "VPI, VCI" values to VPNs. By searching the VPN identification table for a match with the search key of the "VPI, VCI" value specified in the packet header, the VPN edge router finds a VPN across which the received packet passed. Once the VPN has been found out, the edge router searches the routing table for the VPN across which the received packet passed, determines the next forwarded-to-destination of the packet across the ISP network, and generates a capsule header containing information to be used for VPN identification in the network. The VPN edge router attaches this header to the packet and sends the packet to the determined next forwarded-to-destination.

In the present invention, VPN identification is performed by using the identifiers of logical channels multiplexed and terminated to a physical interface as described above. Therefore, it is not necessary to provide the VPN edge router with physical interfaces corresponding to VPNs interconnected by the router. To connect one corporate network to a plurality of VPNs according to the invention, preparing as many logical channels as the number of VPNs is only required, but preparing as many physical lines as the number of VPNs is not necessary. Even when an ATM network or a frame relay provided by another ISP or carrier is used as intermediate access means from a corporate network to the ISP network that provides VFN service, the present invention enables building a network system having VPNs because the VPNs are identified by their logical channels to the VPN edge router.

Furthermore, when the router is set up to interconnect VPNs, the present invention allows the ISP network administrator to select a VPN identifier type proper for each VPN-specific lower layer protocol below IP and register it in the VPN ID indication table. Therefore, a network system can be built to comprise VPNs that run under various kinds of lower layer protocols.

BRIEF DESCRIPTION OF THE DRAWINGS

Other objects and advantages of the invention will become apparent during the following discussion of the accompanying drawings, wherein:

FIG. 6 shows example contents of the VPN ID indication table.

FIG. 7 shows example contents of the VPN identification table.

FIG. 8 shows example contents of a routing table for VPN.

DESCRIPTION OF THE PREFERRED EMBODIMENTS

Figure 1:
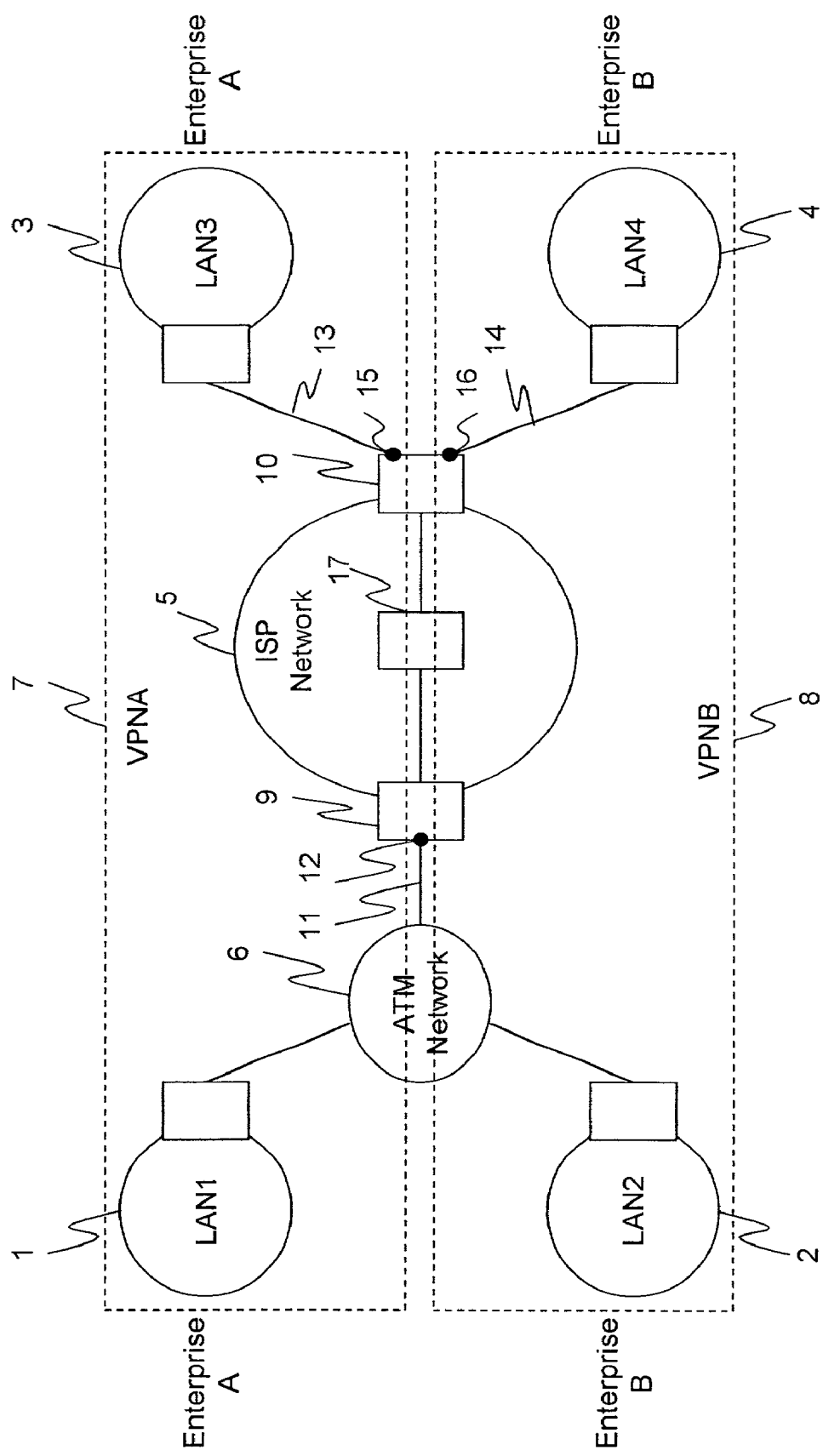
FIG. 1 is a schematic diagram for explaining a preferred embodiment of forming VPNs interconnected by VPN edge routers according to the present invention.

FIG. 1 is a schematic diagram for explaining a preferred embodiment of forming VPNs interconnected by VPN edge routers according to the present invention. Hereinafter, a lower layer will mean a protocol for encapsulating datagrams in IP packets. Even if an IP header is used to encapsulate datagrams of IP packets, this capsule header will be represented as a lower layer header for convenience.

An ISP network (5) has edge routers (9 and 10) positioned at the boundaries of the network and a core router (17) positioned in the core of the network. Although a single core router (17) is shown in FIG. 1, the number of core routers is not limited to one. Datagrams are assumed to be encapsulated by MPLS (for ATM) to pass across the ISP network (5), thus implementing reliable data transmission across VPNs. Not only this encapsulation protocol but also other encapsulation protocols mentioned above may be used. The ISP network (5) interconnects LAN1 (1) and LAN2 (2) via the edge router (9) and LAN3 (3) and LAN4 (4) via the edge router (10). The LAN1 (1) and the LAN3 (3) are assumed to be possessed by corporation A and one VPN is formed to cover these LANs. The LAN2 (2) and the LAN4 (4) are assumed to be possessed by corporation B and another VPN is formed to cover these LANs. The corporation A's VPN is to be called VPNA (7) and the corporation B's VPN is VPNB (8).

The LAN1 and LAN2 are logically multiplexed on a line (11) and connected to the edge router (9) via an ATM network (6) that is provided by another ISP or carrier separately from the ISP network (5). A physical interface (12) interfaces the line (11) and the edge router (9). The physical interface means the point of connection between the router and the line. Meanwhile, the LAN3 (3) and LAN4 (4) are connected to the edge router (10) with lines (13) and (14) respectively by using PPP Over SONET (POS) prescribed in RFC2615. Physical interfaces (15) and (16) interface the lines (13) and (14) with the edge router respectively.

In the present embodiment, combined VPI and VCI values are used as identifiers to identify one VPN to which the LAN1 belongs and another VPN to which the LAN2 belongs. In the VPN ID indication table that the edge router (9) holds inside, a "VPI, VCI" value shall be set in the VPN ID entry field for the physical interface (12). Meanwhile, the edge router (10) uses numbers assigned to the physical interfaces as identifiers to identify one VPN to which the LAN3 belongs and another VPN to which the LAN4 belongs. In the VPN ID indication table that the edge router (10) holds inside, a "physical interface number" shall be set in the VPN ID entry fields for the physical interfaces (15) and (16). The VPN ID indication table will be detailed later.

The edge router (9) also internally holds a VPN identification table that maps a specific VPN ID to information that indicates what VPN across which the packet with the VPN ID passed (this information is hereinafter referred to as a VPN number). The above-mentioned VPNA and VPNB are used as VPN number. Moreover, the edge router (9) internally holds routing tables that map a destination IP address of the packet to an output route number and capsule header information. The router holds the routing table prepared for VPNA and the routing table prepared for VPNB. The VPN identification table and the routing tables will also be detailed later.

When the edge router (9) receives an IP packet that is sent from the LAN1 to the LAN3, it determines that "VPI, VCI" values are used as VPN identifiers, according to the setting in the VPN ID indication table. After determining the VPN identifier type, the edge router (9) searches the VPN identification table that maps "VPI, VCI" values to VPNs and finds that the packet passed across the VPNA. Then, the edge router (9) searches the routing table for VPNA for a match with the search key of the destination IP address of the packet and determines the core router (17) as the next forwarded-to-destination. At this time, the capsule header that is to be attached to the packet passed across VPNA and to be forwarded to the core router is determined as well. After this capsule header is attached to the packet, the packet is forwarded to the core router (17).

The core router (17) has a routing table that maps capsule headers, that is, "VPI, VCI" values to next forwarded-to-destinations. The core router (17) searches this routing table for a match with the search key of the information in the capsule header of the received packet and determines the next forwarded-to-destination (edge router (10)) and the next capsule header The core router (17) attaches the next capsule header to the packet and sends the packet to the edge router (10).

The edge router (10), which is configured identically to the edge router (9), searches its VPN identification table for a match with the search key of the information in the capsule header of the received packet and finds that the packet passed across the VPNA as the edge router (9) does. Then, the edge router (10) searches its routing table for VPNA for a match with the search key of the destination IP address of the packet and determines the forwarded-to-destination. The edge router (10) removes the capsule header from the packet and forwards the packet to the LAN3.

Because the edge router (9) identifies a VPN by finding the VPN ID out of the identifiers of the logical channels multiplexed and terminated to the physical interface and then searches the routing table for the VPN, one of the logically multiplexed VPNs on one physical line can be identified. In this way, packets can be forwarded to their correct destinations even if an IP address used in the corporation A's network is also used in the corporation B's network.

When packets are sent from the LAN 4 to the LAN 2 across the VPNB, similarly, the sending is performed by following the same procedure as described above, except that the edge router (10), when receiving the IP packets sent from the LAN 4 to the LAN 2, uses physical interface numbers as VPN identifiers.

Figure 2:
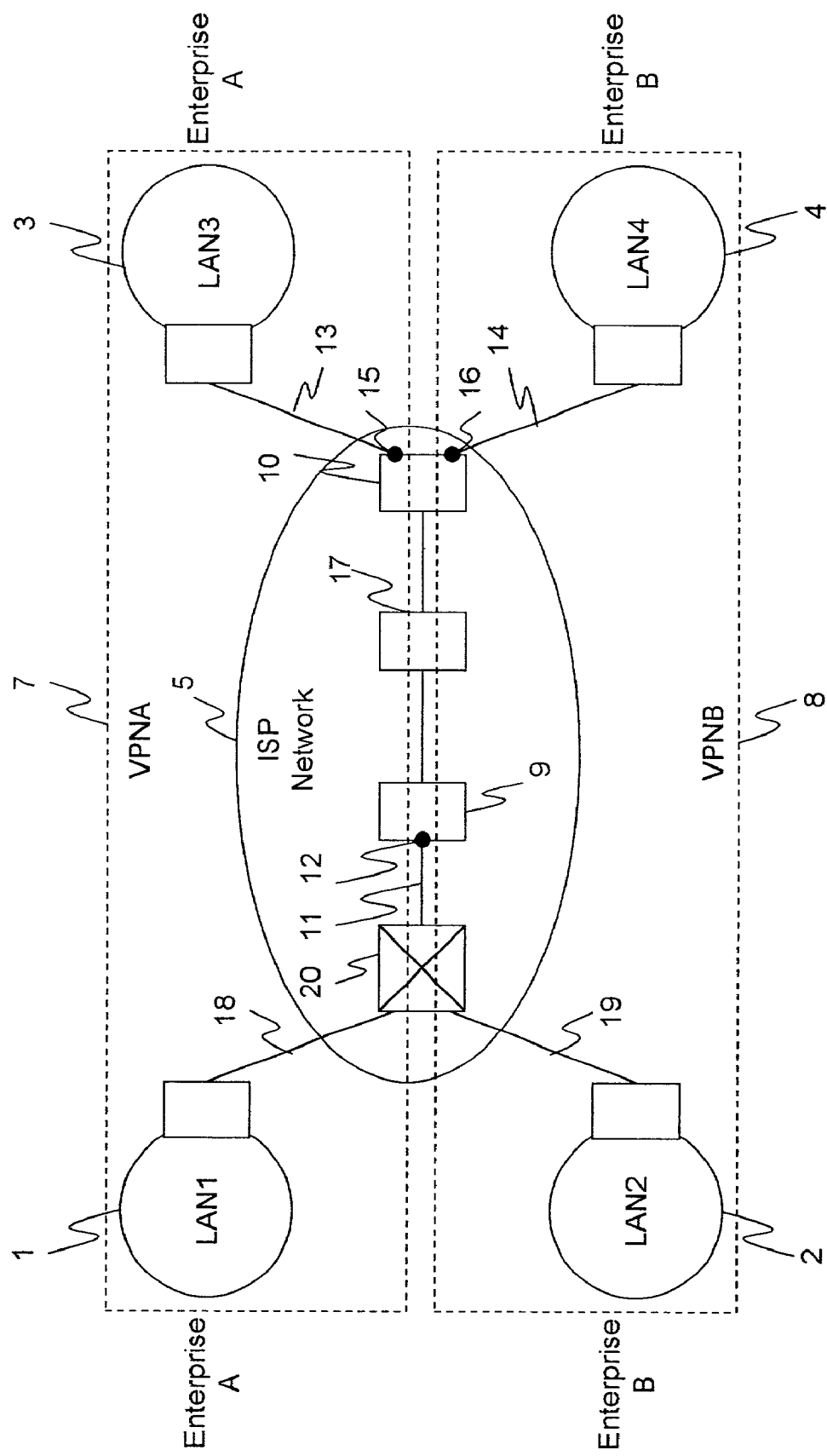
FIG. 2 is a schematic diagram for explaining an example of modification to the network topology embodiment example shown in FIG. 1.

FIG. 2 is a schematic diagram for explaining an example of modification to the network topology embodiment example shown in FIG. 1. In this modified embodiment, the LAN 1 and LAN 2 are directly connected to a multiplexer (20) in the ISP network (5) with separate lines (18) and (19). At the multiplexer (20), different "VPI, VCI" values are assigned to the VPNA and VPNB networks. As does in the case of FIG. 1, the edge router (9) uses "VPI, VCI" values to identify the VPNs.

Figure 3:
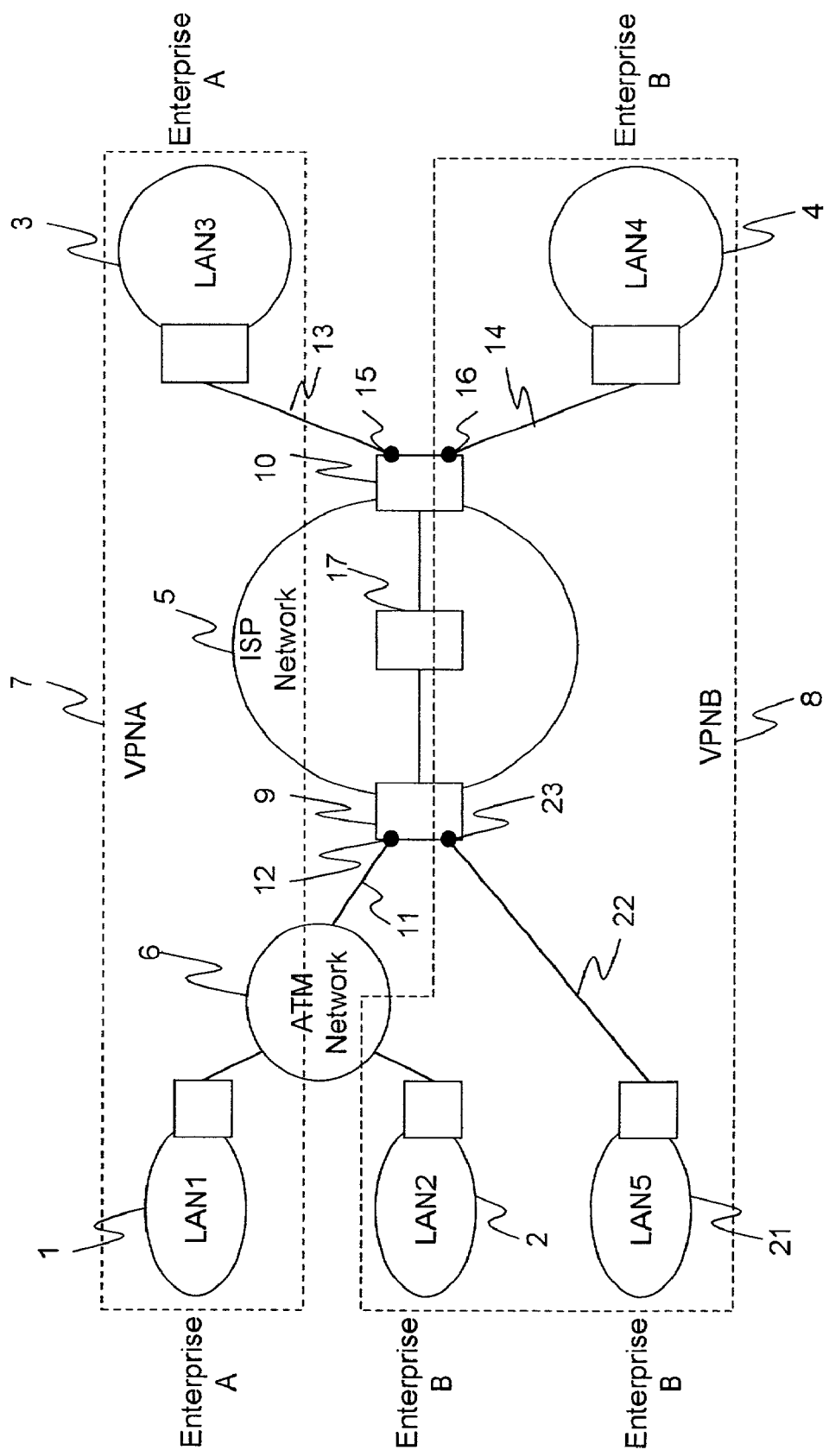
FIG. 3 is a schematic diagram for explaining another example of modification to the network topology embodiment example shown in FIG. 1.

FIG. 3 is a schematic diagram for explaining another example of modification to the network topology embodiment example shown in FIG. 1.

In FIG. 3, LAN5 (21) is added to the network topology shown in FIG. 1 and the VPNB is formed to cover the LAN2, LAN4, and LAN 5. The LAN5 (21) uses POS and is connected to the edge router (9) with a line (22). A physical interface (23) interfaces the line (22) and the edge router (9).

As described for FIG. 1, the edge router (9) uses "VPI VCI" values as identifiers to identify one VPN to which the LAN1 belongs and another VPN to which the LAN2 belongs. At the same time, the edge router (9) uses a physical interface number as the identifier of the VPN to which the LANS belongs. In the VPN ID indication table that the edge router (9) holds inside, a "physical interface number" shall be set in the VPN ID entry field for the physical interface (23). In this third embodiment, the edge router (9) internally holds two VPN identification tables; one table that maps "VPI, VCI" values to VPNs and the other table that maps physical interface numbers to VPNS. These tables will be detailed later.

For example, if the edge router (9) receives an IP packet sent from the LAN 5 to the LAN4, it determines that physical interface numbers are used as VPN identifiers, according to the setting in the VPN ID indication table. After determining the VPN identifier type, the edge router (9) searches the VPN identification table that maps physical interface numbers to VPNs for a match with the search key of the "physical interface number" across which it received the packet and finds that the IP packet passed across the VPNB. Then, the edge router (9) searches the routing table for VPNB for a match with the search key of the destination IP address of the packet and determines the core router (17) as the next forwarded-to-destination. At this time, the capsule header to be attached to the packet to be sent to the determined core router is determined as well. After this capsule header is attached to the packet, the packet is forwarded to the core router (17).

In the third embodiment, different types of VPN identifiers are set for different lower layer protocols and separate VPN identification tables for VPN identifier types are created. In this method, the freedom of one router to cope with different lower layer protocols is increased. Specifically, the procedure according to this embodiment is as follows. When setting up the edge router to interconnect VPNs that use different lower layer protocols, register VPN identifier types proper to the lower layer protocols into the VPN ID indication table. Register discrete VPN identifiers into VPN identification tables separately created for VPN identifier types. In this way, the edge router can be set up to interconnect VPNs, coping with various kinds of lower layer protocols that are different for different VPNS.

Next, the detail of the VPN edge router offered by the present invention will be described below. For the implementation of organizing VPNs into a network system, the topology having networks may be diversified besides the network topology examples shown in FIGS. 1 to 3. In the following, therefore, the VPN edge router of the present invention will be discussed as the one configured to have more general application rather than the restricted application to the network system examples shown in FIGS. 1 to 3.

An example of the configuration of the VPN edge router (9) will be explained with reference to FIGS. 4 to 8. The following description also applies to the configuration of the VPN edge router (10).

Figure 4:
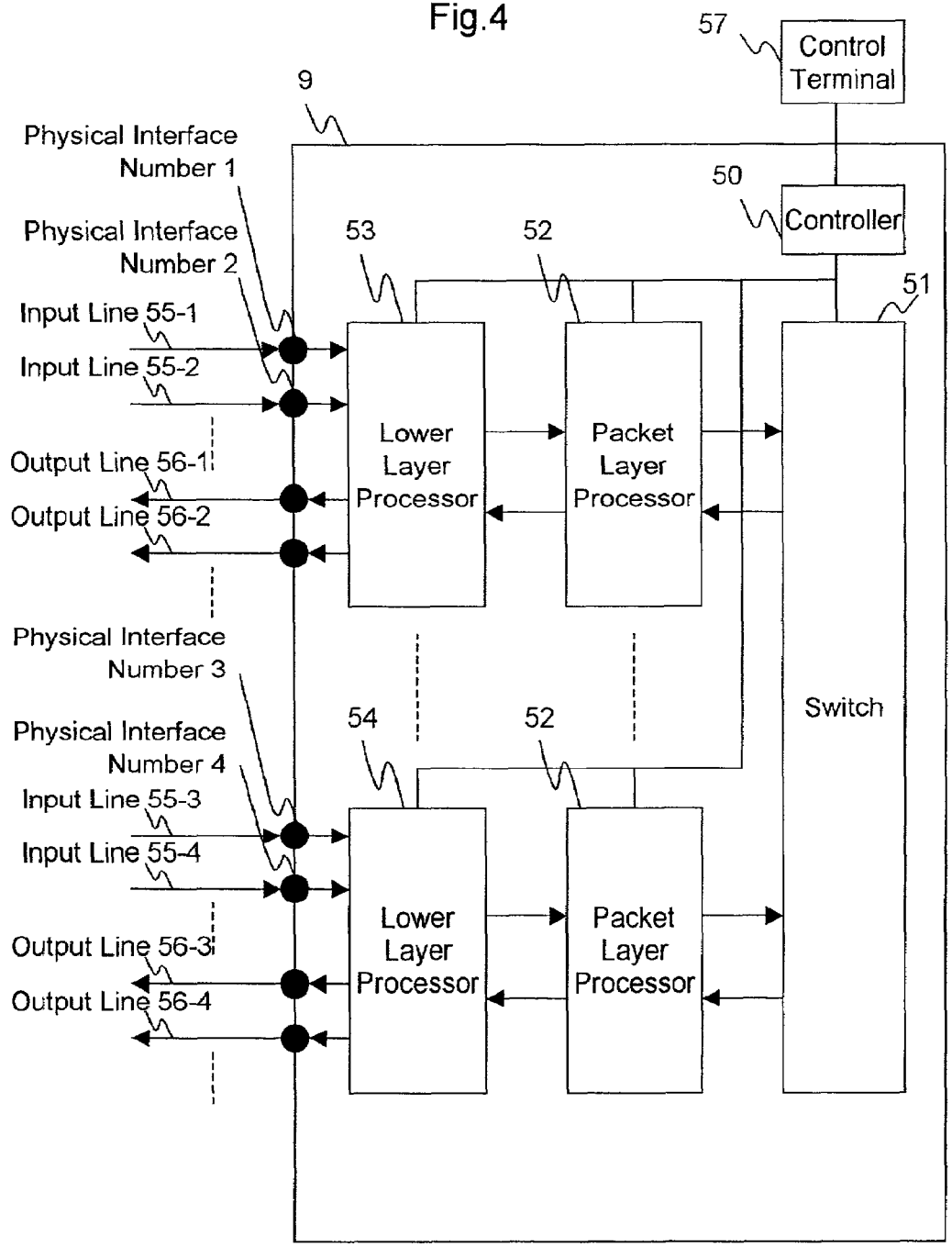
FIG. 4 is a diagram showing an example of the configuration of the VPN edge router offered by the present invention.

FIG. 4 is a diagram showing an example of the configuration of the VPN edge router (9) offered by the present invention. A controller (50), to which lower layer processors (53 and 54), packet layer processors (52), and a switch (51) are connected, executes overall control of the VPN edge router and routing processing. The lower layer processors (53 and 54) accommodate lines (55 and 56) and execute the termination of a lower layer protocol below IP. The packet layer processors (52) receive lower layer information and an IP packet from the lower layer processors (53 and 54) and determine a forwarded-to-destination of the packet by using the lower layer information and the information in the header of the IP packet. The switch (51) has a plurality of input/output ports that are connected to the packet layer processors. The switch (51) comprises, for example, a crossbar switch. When the switch (51) receives a packet from either of the packet layer processors (52), it outputs the packet to the output port for the forwarded-to-destination of the packet as determined by the packet layer processor (52). A control terminal (57) is connected to the above-mentioned controller (50). This control terminal allows the router administrator to register settings into the VPN ID indication table, the VPN identification tables, and the routing tables retained in the router. Points at which input lines 55-1, 55-2, 55-3, and 55-4 connect to the router (9) are assigned physical interface numbers 1, 2, 3, and 4, respectively.

Figure 5:
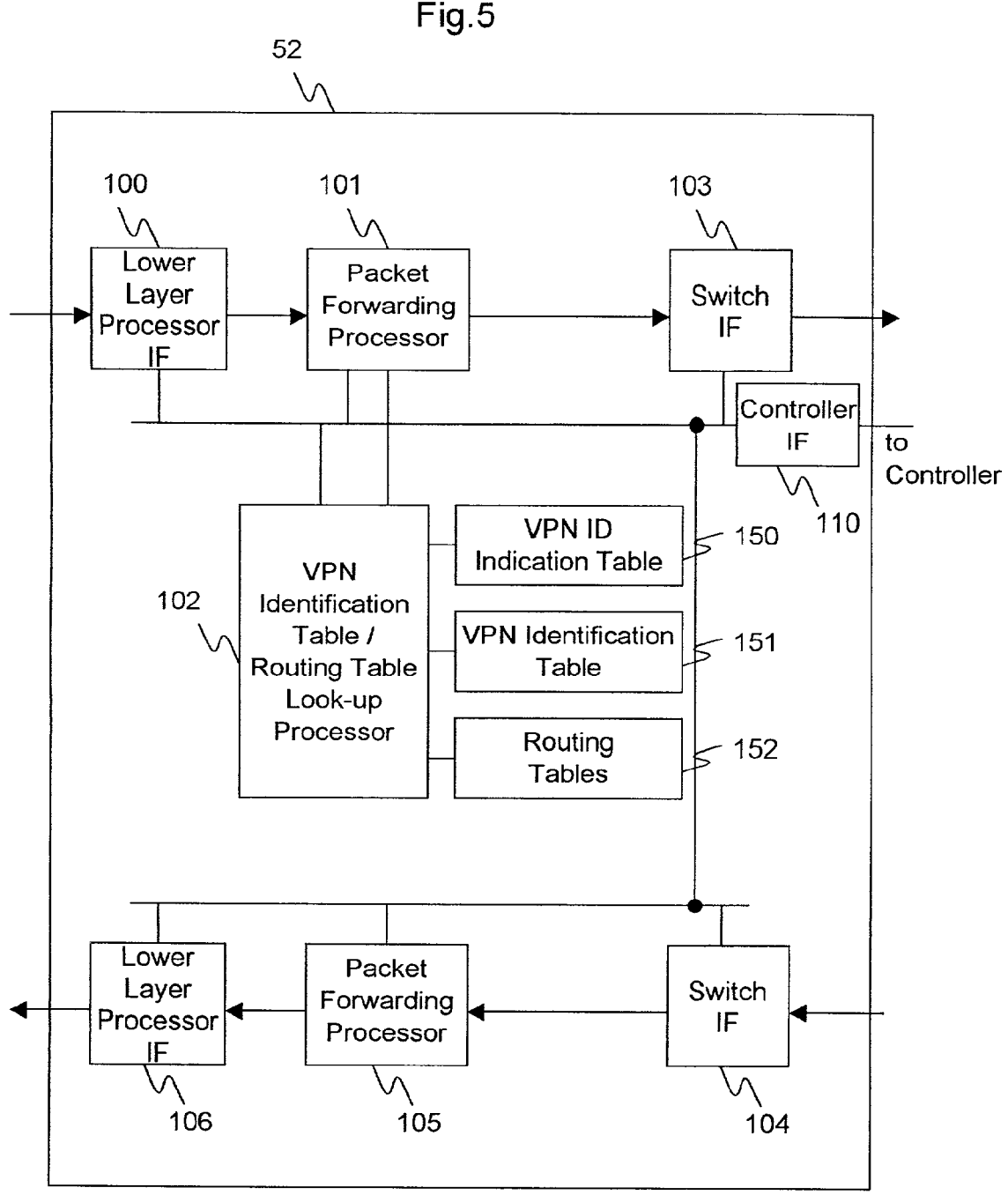
FIG. 5 is a diagram showing an example of the configuration of a packet layer processor.

FIG. 5 is a diagram showing an example of the configuration of a packet layer processor (52). Lower layer processor interfaces (IFs) (100 and 106) interface with the lower layer processors (53 and 54). Switch IFs (103 and 104) interface with the switch (51). A controller IF (110) interfaces with the controller (50). One of the features of the present invention embodied as described herein is that the router holds a VPN ID indication table (150), a VPN identification table (151), and routing tables for VPNs (152). These tables are stored into storage. They may be stored into different physical storage devices or different areas in a single storage device. How these tables are stored is not an essential matter of implementing the present invention. The VPN ID indication table (150), VPN identification table (151), and routing tables (152), and how other blocks, not described here, work and the structures thereof will be described in the following wherein how the router (9) handles packets will be explained.

Assume that packets are received across the line (55) to the lower layer processor (53) and forwarded across the line (56) from the lower layer processor (54). Using this case as an example, how the router (9) handles packets will be explained below.

When the lower layer processor (53) receives a packet from a LAN, it terminates the lower layer protocol below IP for the packet. To a packet forwarding processor (101), the lower layer processor (53) transfers the IP packet and the information relevant to the packet including the physical interface number at which the packet was received (hereinafter referred to as a receiving physical interface number), the lower layer protocol type, and the capsule header information for the lower layer to be used as the VPN identifier. The packet forwarding processor (101) extracts the IP header information from the IP packet it received and transfers the IP header information, the receiving physical interface number, the lower layer protocol type, and the capsule header information for the lower layer to be used as the VPN identifier to a VPN identification table/routing table look-up processor (102). The IP packet itself is temporally accumulated in the packet forwarding processor (101).

The VPN identification table/routing table look-up processor (102) first searches the VPN ID indication table (150) for a match with the search key of the receiving physical interface number or the lower layer protocol type and determines what the VPN identifier is.

FIG. 6 shows example contents of the VPN ID indication table (150). The table contains the entries of physical interface number (200), lower layer protocol (203), and VPN ID (201). For "ATM" entries as the lower layer protocol, CLP subfields for indicating packet forwarding priority are also included in the table shown in FIG. 6, but the CLP subfields may be deleted from the table. As described above, the administrator of the edge router (9) can register VPN ID settings into this table via the control terminal (57). The VPN identification table/routing table look-up processor (102) searches this table for a match with the search key of the receiving physical interface number and determines what the VPN ID (201) is. For example, if the receiving physical interface number is 1, it is determined that the VPN ID is "VPI, VCI." If the receiving physical interface number is 3, it is determined that the VPN ID is "physical interface number." If the table includes the CLP subfields, as embodied in this example, a combination of "VPI, VCI" and "CLP" or a combination of "physical interface number" and "CLP" may be used as the VPN ID. Advantages of including the CLP (204) in the VPN ID will be described later. If there are a plurality of VPNs terminated to one physical interface and different protocol packets to pass across different VPNs are logically multiplexed and sent to the physical interface, when one of these packets is received, what VPN across which that packet passed cannot be determined by the receiving physical interface number. However, if the lower layer protocol for the packet is ATM, what VPN across which that packet passed can be identified by using "VPI, VCI" values as VPN identifiers. Meanwhile, if packets passed cross one VPN are exclusively terminated to one physical interface, the VPN can be identified by the receiving physical interface number. As the search key for the above table, a combination of a lower layer protocol (203) and a physical interface number (201) may be used. For example, assume that the line connected to physical interface number 4 is a time division multiplex line and packets transmitted by frame relay as the lower layer protocol and packets transmitted by Point to Point Protocol (PPP) as the lower layer protocol are multiplexed on the line. In the above table, assume that a "DLCI" value is set as the VPN ID entry for "frame relay" as the lower layer protocol entry and a "time slot number" is set as the VPN ID entry for "PPP" as the lower layer protocol entry. In this case, a look-up for VPN ID with the search key of only the receiving physical interface number 4 cannot distinctly find whether the VPN ID is "DLCI" or "time slot number." Therefore, the search key of the combination of a lower layer protocol and a physical interface number should be applied to the look-up for VFN ID.

Once VPN ID has been determined, the VPN identification table/routing table look-up processor searches the VPN identification table (151) for a match with the search key of the VPN ID and determines a VPN across which the received packet passed.

FIG. 7A and FIG. 7B show example contents of the VPN identification table (151). Both examples of the VPN identification table contain the entries of VPN ID (201) and VPN number (250).

FIG. 7A shows an example of the VPN identification table where "VPI, VCI" values are used as VPN ID (201). CLP subfields (204) and internal priority information fields (251) included in the table shown in FIG. 7A may be deleted from the table. The internal priority information fields (251) are used to indicate information on packet handling priority within the router. The VPN identification table/routing table look-up processor (102) searches the VPN identification table for a match with the search key of the VPN identification information included in the packet header in accordance with the VPN ID as the other search key determined by searching the above VPN ID indication table and determines what the VPN number (250) is. If the VPN identification table (151) includes the CLP subfields (204) and the internal priority information subfields (251), as embodied in this example, a combination of "VPI, VCI" and CLP (204) that indicates packet forwarding priority may be used as the search key. By including the CLP in the search key, different internal priority information can be set for packets sorted under a same VPN number: e.g., if "VPI, VCI"=a and CLP=0, internal priority information=a; if "VPI, VCIf"=a and CLP=1, internal priority information=b.

FIG. 7B shows an example of the VPN identification table where physical interface number (252) is used as the VPN ID (201). Unless packet handling priority control is executed, the internal priority information subfields (251) shown in FIG. 7B are not necessary.

If VPN IDs other than the above, such as VPN IDs in DLCI values and time slot numbers, are used, the VPN identification table may be reorganized appropriately, but basically the same as those shown in FIGS. 7A and 7B. Specifically, a discrete VPN identification table (151) is created for each VPN ID type and values to be set in the table shall be entered via the control terminal (54). VPN identification tables (151) created for all VPN ID types may be stored in a single storage device or different storage devices.

One a VPN number has been determined, the VPN identification table/routing table look-up processor searches the routing table (152) that is for the VPN designated by the VPN number and determines an output route and capsule header information to send packet that is to be attached to the packet sorted under that VPN number.

FIG. 8 shows example contents of a routing table (152) for VPN. The VPN identification table/routing table look-up processor (102) holds separate routing tables (152) for the VPNs interconnected by the router. These routing tables (152) separately created for the VPNs may be stored into a single storage device or different storage devices. Any routing table (152) for VPN contains the entries of destination IP address (300), output route number (301), and output capsule header information (302). The output route number (301) is the intra-router identifier of a route across which the switch forwards the packet to a predetermined interface. The output capsule header information (302) is the information for capsule header that is used to send the packet across the ISP network (5). The VPN identification table/routing table look-up processor (102) searches the routing table for the VPN designated by the VPN number (250) determined by searching the above VPN identification table for a match with the search key of the destination IP address included in the IP packet header, thereby determining what the output route number (301) and the output capsule header information (302) are. Because the router in the present embodiment holds separate routing tables (152) for the VPNs interconnected by the router, a correct output route can be determined even if an IP address used in one VPN is also used in another VPN.

Once the appropriate output route number (301) and output capsule header information (302) have been determined, the VPN identification table/routing table look-up processor (102) transfers the determined output route number (301) and output capsule header information (302) to the packet forwarding processor (101).

The packet forwarding processor (101) transfers the IP packet itself accumulated there, the output route number (301), and the output capsule header information (302) to the switch (51) through the switch IF (103). The switch (51) outputs the IP packet itself and the output capsule header information (302) received from the packet forwarding processor (101) to the output port designated by the output route number.

The packet layer processor (52) connected to the above output port, that is, the receiving-end packet layer processor (52) receives the IP packet itself and its output capsule information (302) sent from the preceding packet layer processor (52) through the switch IF (104). On receiving the IP packet itself and its output capsule information (302), the packet forwarding processor (105) transfers them to the lower layer processor (54) through the lower layer processor IF (106). On receiving the IP packet itself and its output capsule header information (302), the lower layer processor (54) generates a capsule header, based on the output capsule header information, and encapsulates the IP packet in another IP packet with the capsule header, and sends the new IP packet that contains the capsule header and the encapsulated packet to the core router (17).

The VPN edge router configured as shown in FIGS. 4 to 8 was discussed above as one example of its configuration. By using the router embodied in the above example, even if packets are sent across different VPNs and terminated to a same physical interface, the VPNs across which the packets passed can be identified. Even if a same edge router interconnects a plurality of LANs that use network-specific lower layer protocols below IP, VPN identifiers proper for lower layer protocols can be set in the VPN ID indication table and this increases the freedom of organizing VPNs into a network system.

Although, in the router embodiment discussed above, output capsule header information is directly obtained by searching the routing table for VPN, the table entry can be altered so that a output capsule number may be obtained. This output capsule number is an intra-router identifier that specifies a capsule header to be attached to the packet in the lower layer processor to which the output line attaches. If capsule numbers are used, the lower layer processor to which the output line attaches must hold a header generation table that contains capsule number and capsule header pairs. The above lower layer processor searches the header generation table for a match with the search key of a capsule number and determines the mating capsule header.

The tables discussed above are logical tables. Look-up algorithm typically known as tree structure may be used as a table search method or structure by using a Content Addressable Memory (CAM) and a sequential table search method may be taken.

If a time division multiplex line is connected to the VPN edge router, time slot numbers may be added to the information to be transferred from the lower layer processor to the packet layer processor besides the information items described in the above router example. In this case, a "time slot number" may be set as a VPN ID entry in the VPN ID indication table. As the search key for searching the VPN identification table, a time slot number may be used.

If an Ethernet is connected to the VPN edge router and packets to pass across the Ethernet are VLAN encapsulated in compliance with IEEE802.1Q, VLAN Tag information may be added to the information to be transferred from the lower layer processor to the packet layer processor besides the information items described in the above router example. In this case, a "VLAN Tag" value may be set as a VPN ID entry in the VPN ID indication table. As the search key for searching the VPN identification table, VLAN Tag information may be used.

If received IP packets are encapsulated with a L2TP header prescribed in Layer2 Tunneling Protocol (L2TP), appropriate information contained in the L2TP header (such as tunnel ID, session ID, etc.) may be set as a VPN ID entry in the VPN ID indication table.

If received IP packets are encapsulated with a capsule header prescribed by a PPP Over Ethernet encapsulation protocol, information contained in the capsule header may be added to the information to be transferred from the lower layer processor to the packet layer processor besides the information items described in the above router example. In this case, appropriate information (such as session ID) specified in the capsule header prescribed by the PPP Over Ethernet encapsulation protocol may be set as a VPN ID entry in the VPN ID indication table.

Figure 9:
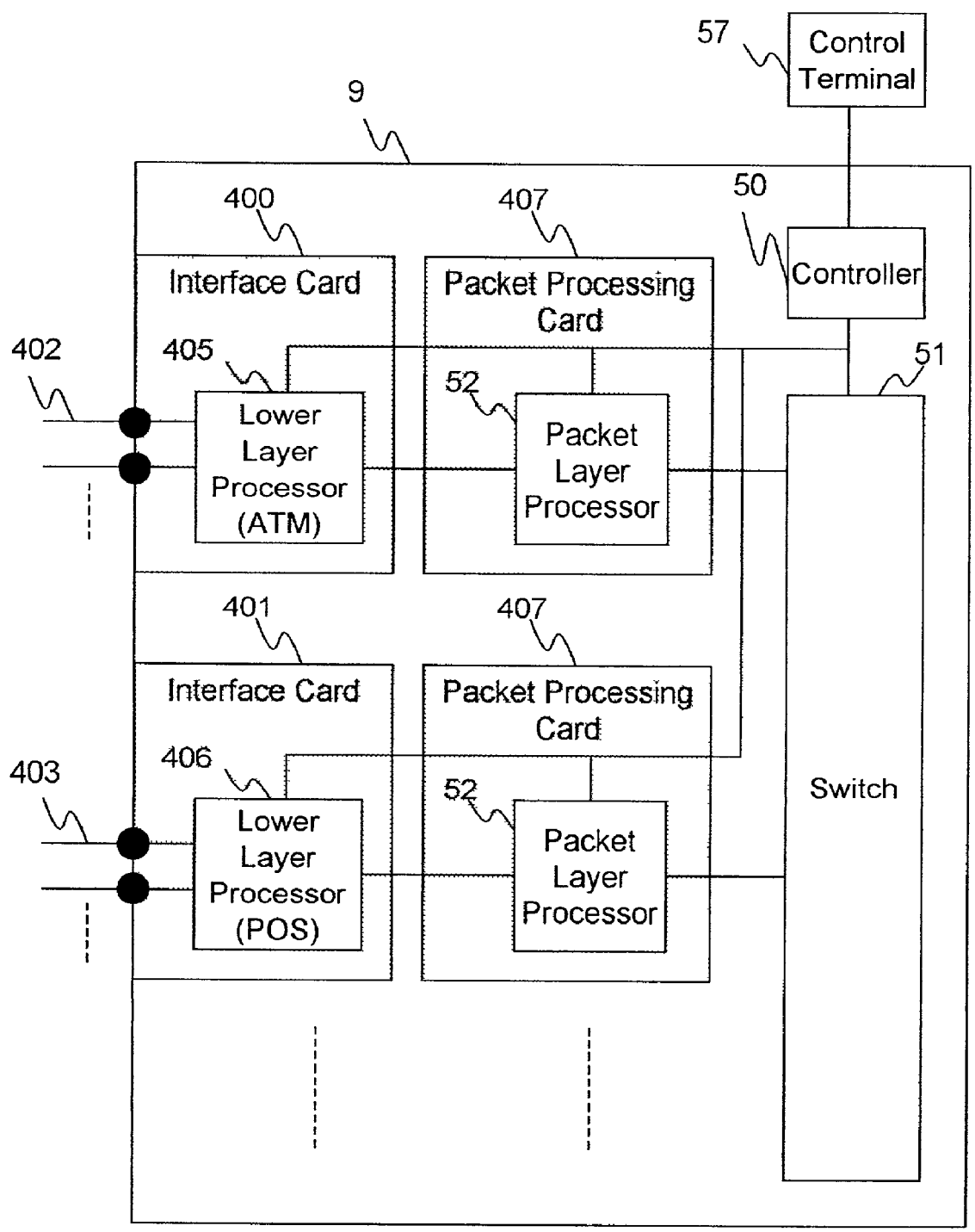
FIG. 9 shows another example of the configuration of the VPN edge router offered by the present invention.

FIG. 9 shows another example of the configuration of the VPN edge router (9) offered by the present invention. Each of interface cards (400 and 401) accommodates lines for datagrams of same lower layer protocol. For example, the interface card (400) is for ATM datagrams and accommodates ATM lines (402). The interface card (401) is for POS datagrams and accommodates POS lines (403). The interface cards (400 and 401) can be mounted and removed if necessary and the router administrator can mount the required number of interface cards for lower layer protocols required for router operation on the router. On the interface cards, lower layer processors (405 and 406) are installed to execute processing specific to the lower layer protocols. The lower layer processors (405 and 406) operate in the same way as the lower layer processors (53 and 54) shown in FIG. 4 do. Packet processing cards (407) receive IP packets and related information from the above interface cards and execute packet layer processing. The packet processing cards (407) can be mounted and removed if necessary and the router administrator can mount the required number of the cards. On the packet processing cards (407), the packet layer processors (52) described with FIGS. 4 and 5 are installed. According to the attached interface card type and the organization of intermediate access networks between the LANs and the interface cards, the administrator can flexibly set the contents of the VPN ID indication table, VPN identification tables, routing tables for VPNs in the packet processing cards (407) via the control terminal (57). The VPN edge router embodied in this way also handles packets as explained with FIGS. 4 to 8.

Figure 10:
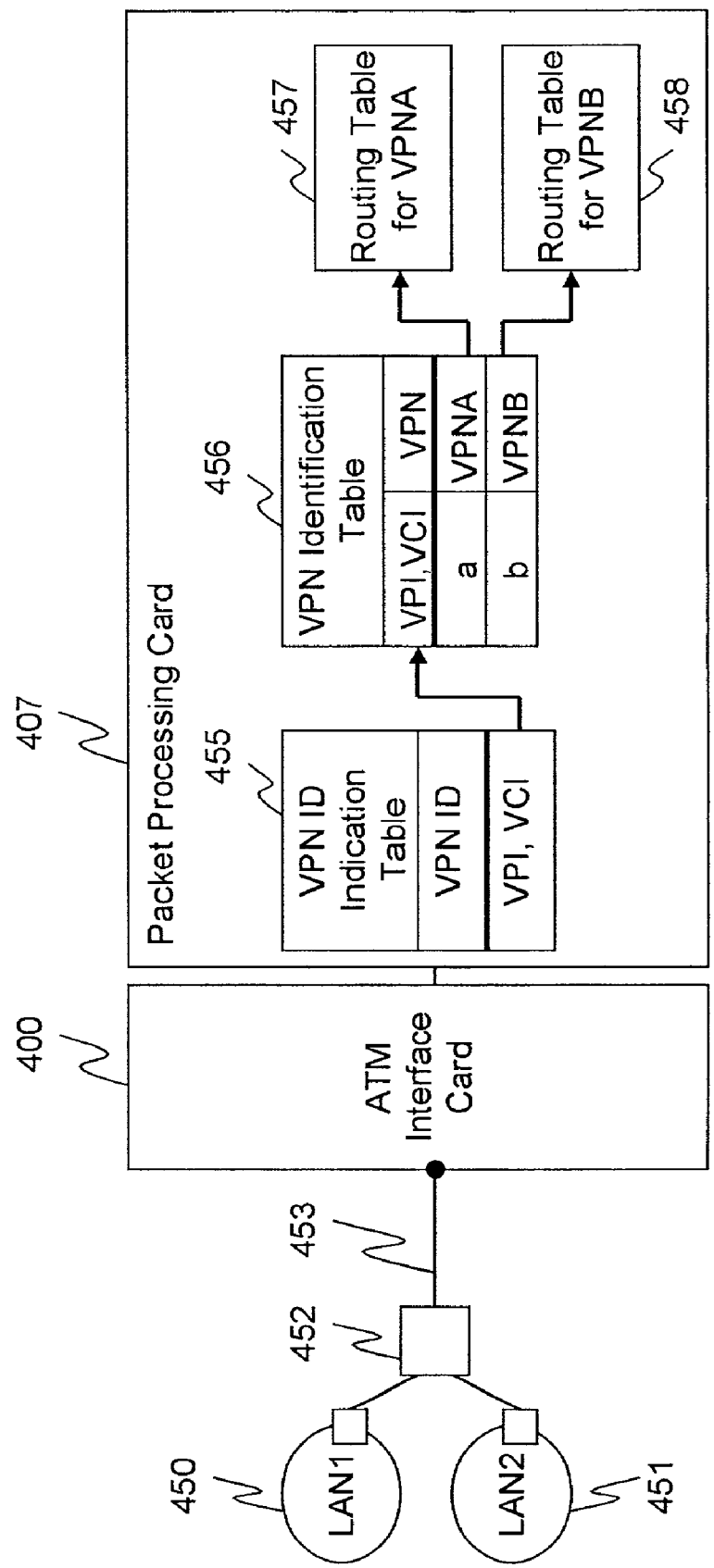
FIG. 10 shows example contents of the VPN ID indication table, VPN identification table, and routing tables for VPNs in a packet processing card when an ATM interface card attaches to the packet processing card.
Figure 11:
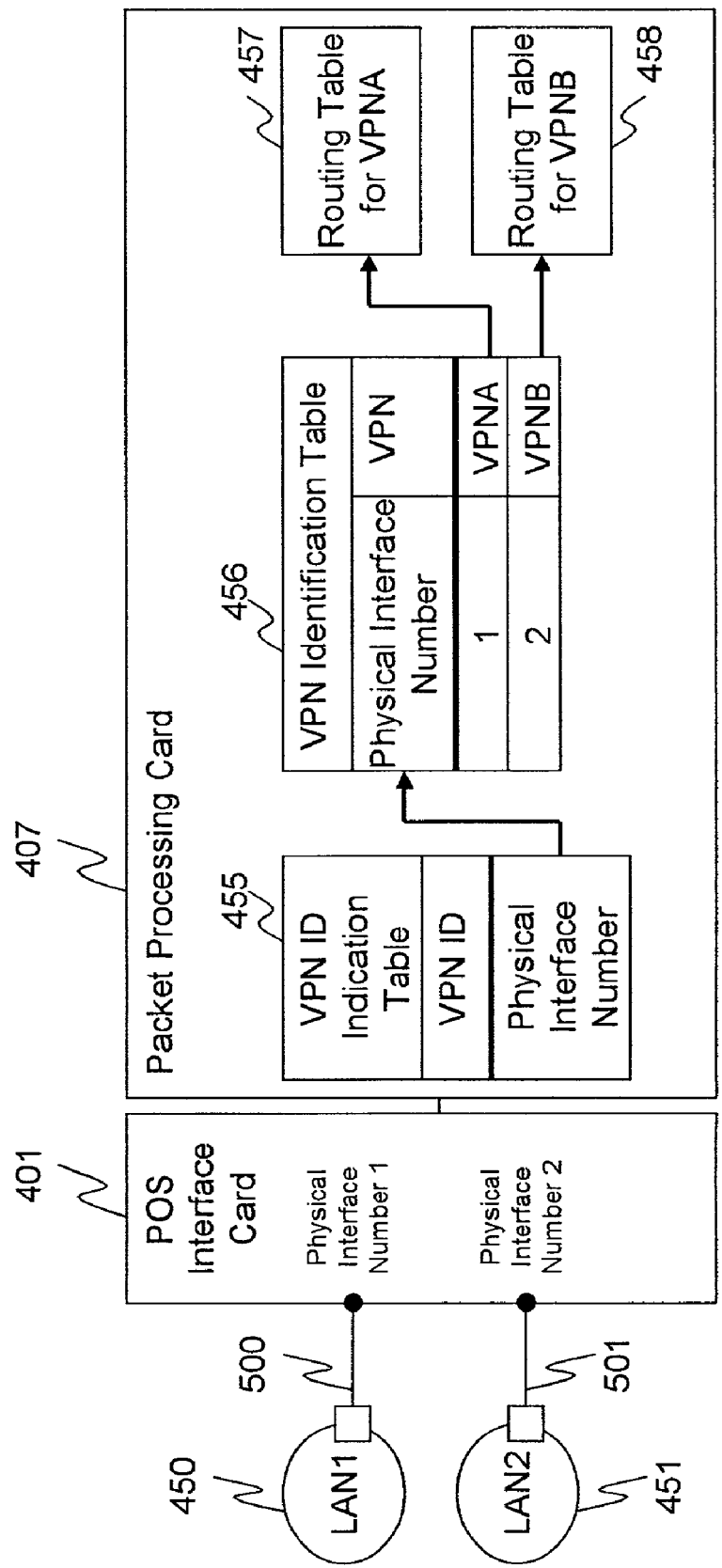
FIG. 11 shows example contents of the VPN ID indication table, VPN identification table, and routing tables for VPNs in the packet processing card when a POS interface card attaches to the packet processing card.
Figure 12:
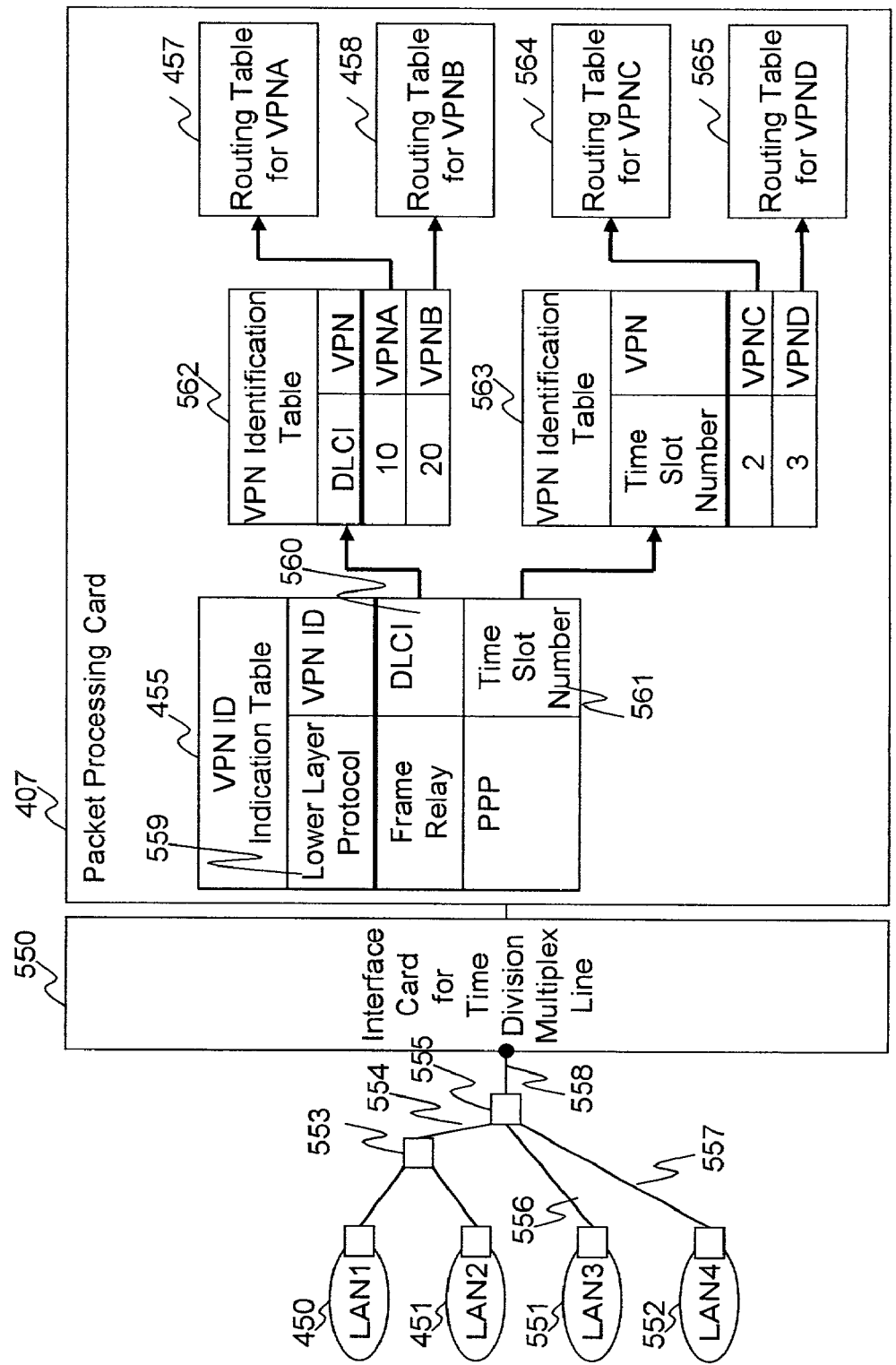
FIG. 12 shows example contents of the VPN ID indication table, VPN identification tables, and routing tables for VFNs in the packet processing card when an interface card for time division multiplex line attaches to the packet processing card.

FIGS. 10 through 12 are schematic representations of the relation between an interface card that attaches to one of the packet processing cards (407) shown in FIG. 9 and the contents of the VPN ID indication table, VPN identification table(s), and routing tables for VPNs held in the packet processing card. FIGS. 10 through 12 show the LANs interconnected by the edge router and only the interface card and the packet processing card out of the components of the edge router (9). The VPN ID indication table, VPN identification table(s), and routing tables for VPNs in the packet processing card are logical tables. In FIGS. 10 through 12, it is assumed that all physical interfaces on a same interface card are assigned VPN identifiers of same type. Therefore, because it is not necessary to set a physical interface number as the search key for the VPN ID indication table, the physical interface number entry as the search key is omitted. If different types of VPN identifiers are used for VPNs terminated to interfaces on a same interface card, it is advisable to use the physical interface number entry as the search key for the VPN ID indication table as described for the preceding router embodiment.

FIG. 10 shows example contents of the VPN ID indication table, VPN identification table, and routing tables for VPNs in the packet processing card when an ATM interface card (400) attaches to the packet processing card (407). LAN1 (450) and LAN 2 (451) are assumed to belong to VPNA and VPNB, respectively. Packets from the LAN1 and LAN2 are multiplexed by a multiplexer (452) and carried across a line (453) to the ATM interface card (400). When multiplexed, the packets from the LAN1 and LAN2 are assigned a value of "a" for LAN1 and a value of "b" for LAN2 as "VPI, VCI" identifiers. In this example, "VPI, VCI" values are used to identify VPNs. In the VPN ID indication table (455) in the packet processing card (407), a "VPI, VCI" value is set as the VPN ID entry. In the VPN identification table (456), a "VPI, VCI" value is set as the search key entry. As routing tables (455) for VPNs, the packet processing card holds the routing table for VPNA (457) and the routing table for VPNB (458). For example, when the router receives a packet from the LAN1, the lower layer processor (405) of the ATM interface card (400) terminates the ATM protocol and transfers the IP packet itself and related information including the "VPI, VCI" identifier and the physical interface number to the packet processing card (407). The VPN identification table/routing table look-up processor of the packet processing card (407) searches the VPN ID indication table (455) and determines that "VPI, VCI" values are used as VPN identifiers. The look-up processor then searches the VPN identification table (456) for a match with the search key of "a" that is the value of "VPI, VCI" of the received packet and finds that the received packet passed across the VPNA. Then, the look-up processor searches the routing table for VPNA (457) and determines the appropriate output route and output capsule header information.

FIG. 11 shows example contents of the VPN ID indication table, VPN identification table, and routing tables for VPNs in the packet processing card when a POS interface card (401) attaches to the packet processing card (407). The LAN1 (450) and LAN2 (451) are assumed to belong to VPNA and VPNB, respectively. The LAN1 and LAN2 are connected to the POS interface card (401) with lines (500) and (501), respectively. Physical interfaces that interface the lines (500) and (501) and the POS interface card (401) are assigned physical interface numbers 1 and 2, respectively. In this case, because physical interface numbers are used to identify VPNs, a "physical interface number" is set as the VPN ID entry in the VPN ID indication table (455) in the packet processing card (407). In the VPN identification table (456), a "physical interface number" is set as the search key. As routing tables for VPNs, the packet processing card holds the routing table for VPNA (457) and the routing table for VPNB (458). Processing within the packet processing card (407) is the same as that explained with FIG. 10, except that physical interface numbers instead of "VPI, VCI" values are used as VPN identifiers.

FIG. 12 shows example contents of the VPN ID indication table, VPN identification tables, and routing tables for VPNs in the packet processing card when an interface card for time division multiplex line (550), which is not shown in FIG. 8, attaches to the packet processing card (407). LAN1 (450), LAN2 (451), LAN3 (551), and LAN4 (552) are assumed to belong to VPNA, VPNB, VPNC, and VPND, respectively. The lower layer protocol for the LAN1 and LAN2 is assumed to be frame relay and that for the LAN3 and LAN4 is assumed to be Point to Point Protocol (PPP). Packets from the LAN1 and packets from the LAN2 are respectively assigned "10" and "20" as DLCI values and multiplexed on a line (554) by a frame relay multiplexer (553). Moreover, a time division multiplexer (555) multiplexes lines (554), (556), and (557) on a line (558). When multiplexed, datagrams carried across the lines (554), (556), and (557) are assigned time slot numbers 1, 2, and 3, respectively. It is assumed that DLCI values are used as VPN identifiers for the LAN1 and LAN2, and time slot numbers are used as VPN identifiers for the LAN3 and LAN4. In this case, in the VPN ID indication table, a "DLCI" (560) value is set as the VPN ID entry for "frame relay" as the lower layer protocol (559) entry. A "time slot number" (561) is set as the VPN ID entry for "PPP" as the lower layer protocol entry. The packet processing card holds two VPN identification tables: that is, one VPN identification table (562) that maps DLCI values to VPN numbers; and another VPN identification table (563) that maps time slot numbers to VPN numbers. The card also holds four routing tables for VPNs: that is, a routing table for VPNA (457), a routing table for VPNB (458), a routing table for VPNC (564), and a routing table for VPND (565). Processing within the packet processing card (407) is the same as that explained with FIG. 10, except the following. The VPN ID indication table is searched with the search key of lower layer protocol (559). As the result of the VPN ID indication table search, the "DLCI" VPN identifiers are used for packets received from the LAN1 and LAN2 and the "time slot number" VPN identifiers are used for packets received from the LAN3 and LAN4.

For FIG. 9 through 12, examples where one interface card attaches one packet processing card were discussed, whereas a plurality interface cards may attach to a packet processing card. Interface cards that are for different lower layer protocols can be attached to one packet processing card.

Figure 13:
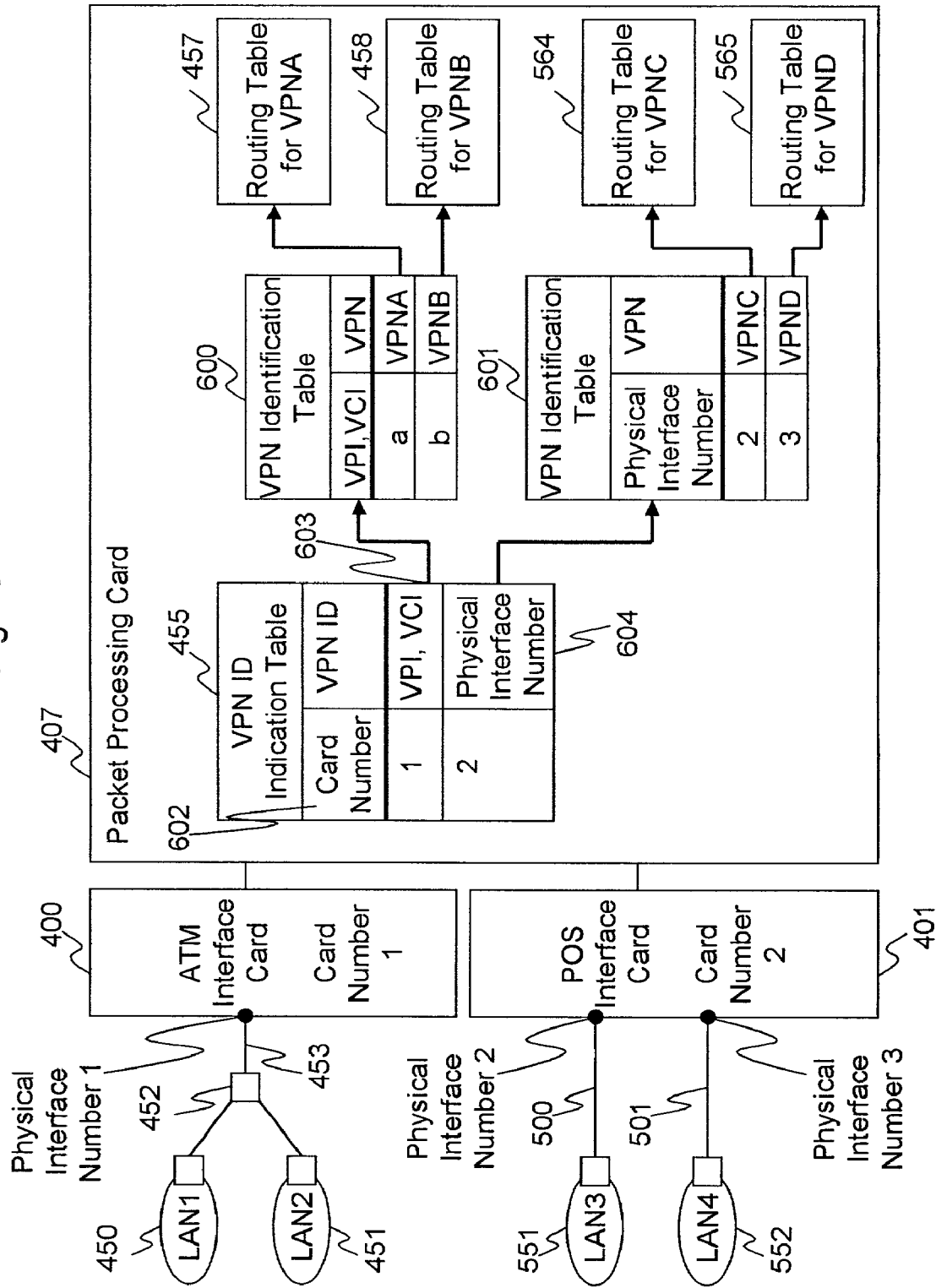
FIG. 13 shows example contents of the VPN ID indication table, VPN identification tables, and routing tables for VPNs in the packet processing card when interface cards for different lower layer protocols attach to the packet processing card.

FIG. 13 shows example contents of the VPN ID indication table, VPN identification tables, and routing tables for VPNs in the packet processing card when interface cards for different lower layer protocols attach to the packet processing card (407). The interface cards are assumed to be the ATM interface card (400) and the POS interface card (401). For FIG. 13, it is assumed that all physical interfaces on a same interface card are assigned VPN identifiers of same type. Because a plurality of interface cards attach to the packet processing card in this example, the interface cards (400) and (401) assigned card numbers 1 and 2, respectively. Card number (602) is set as the search key for the VPN ID indication table (455). LAN1 (450), LAN2 (451), LAN3 (551), and LAN4 (552) are assumed to belong to VPNA, VPNB, VPNC, and VPND, respectively. Packets from the LAN1 and LAN2 are multiplexed by a multiplexer (452) and carried across a line (453) to the ATM interface card (400). When multiplexed, the packets from the LAN1 and LAN2 are assigned a value of "a" for LAN1 and a value of "b" for LAN2 as "VPI, VCI" identifiers. In this case, it is advisable to use "VPI, VCI" values to identify VPNs. In the VPN ID indication table (455), a "VPI, VCI" value is set as the VPN ID entry (603) for card number 1. The LAN3 and LAN4 are connected to the POS interface card (401) with lines (500) and (501), respectively. Physical interfaces that interface the lines (500) and (501) and the POS interface card (401) are assigned physical interface numbers 1 and 2, respectively. In this case, it is advisable to use physical interface numbers to identify VPNs. In the VPN ID indication table (455), a "physical interface number" is set as the VPN ID entry (604) for card number 2. The packet processing card holds one VPN identification table (600) that maps "VPI, VCI" values to VPN numbers and another VPN identification table (601) that maps physical interface numbers to VPN numbers. As routing tables for VPNs, the card holds a routing table for VPNA (457), a routing table for VPNB (458), a routing table for VPNC (464), and a routing table for VPND (465). Processing within the packet processing card (407) is the same as that explained with FIG. 10, except that the VPN ID indication table is searched with the search key of card number (602). Although ATM and POS interface cards attach to the packet processing card in this example, the combination of the interface cards may be varied For example, the POS interface card can be replaced by an interface card for FR. In this case, it may be preferable that packets from the LAN3 and LAN4 are multiplexed on one line and carried to the interface card for FR in the same manner as for the packets from the LAN1 and LAN2 and DLCI values are used to identify VPNs.

The router embodied as explained above with FIGS. 9 to 13 allows the router administrator to flexibly set the contents of the VPN ID indication table, VPN identification tables, routing tables for VPNs in the packet processing cards (407) via the control terminal (57), according to the attached interface card type. Because VPNs are identified by identifiers assigned to multiplex logical channels terminated to a physical interface, when the router receives one of the packets that are sent across the VPNs and logically multiplexed on one line, it can identify a VPN across which the packet passed.

Figure 14:
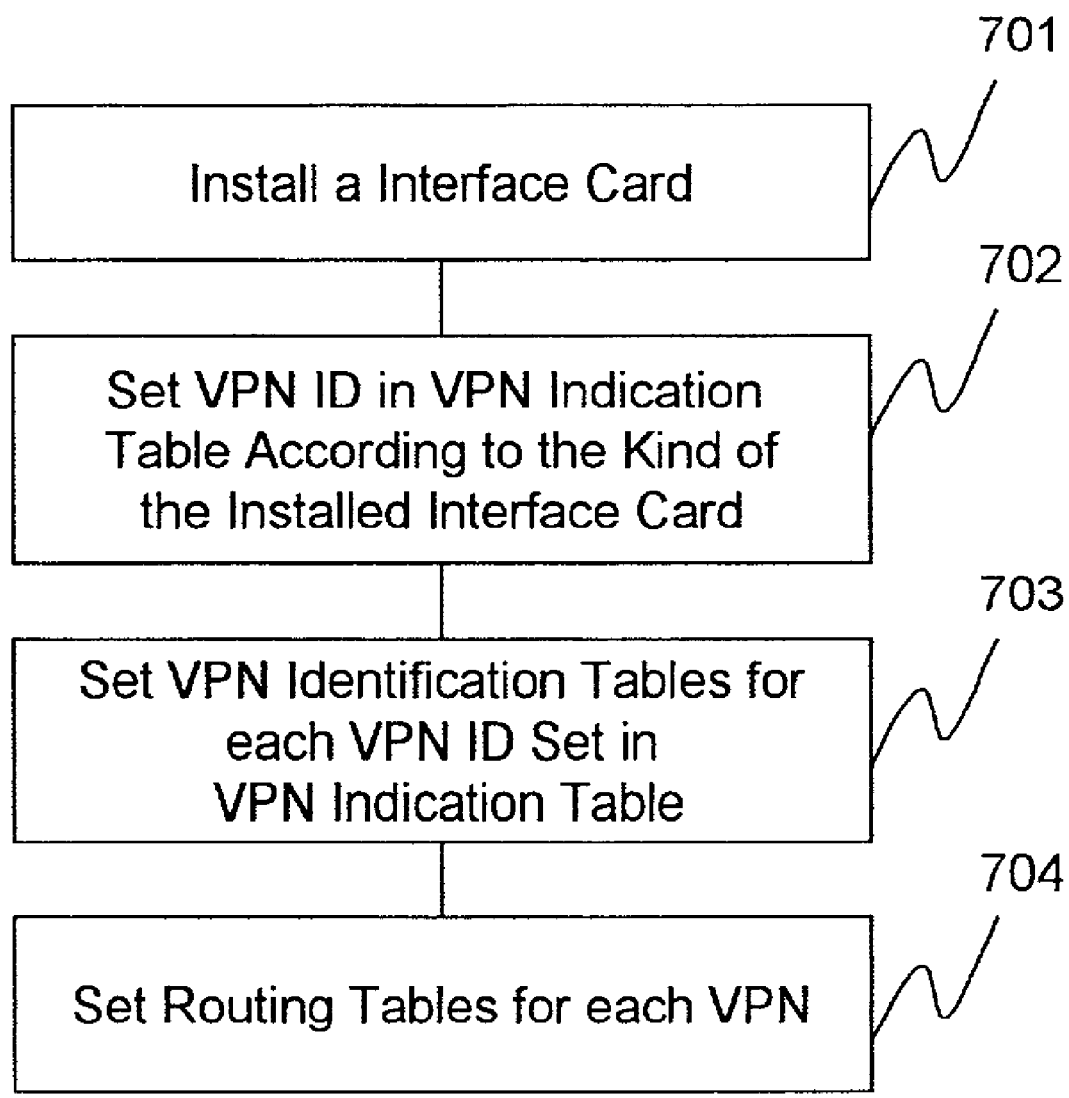
FIG. 14 illustrates an example of the procedure for customizing the internal settings of the packet processing card.

FIG. 14 illustrates an example of the procedure for customizing the internal settings of the packet processing card (407) fit for an interface card that is newly installed. After an interface card is installed on the VPN edge router (9), set VPN IDs into the VPN ID indication table (455) (steps 701 and 702). The administrator can customize the contents of the VPN ID indication table (455), according to the kind of the installed interface card. Then, set the VPN identification tables for each VPN ID set in VPN indication table (step 703). Finally, set routing tables for each of the VPNs interconnected by the router (step 704).

It is also feasible that VPN IDs are automatically registered in the following way. When an interface card is installed to attach to the packet processing card, the interface card is set to communicate with the packet processing card. The interface card automatically finds lower layer protocols specific to the IP packets to terminate to it and notifies the packet processing card of the lower layer protocols. Then, VPN IDs predefined for the lower layer protocols thus notified can be automatically registered into the VPN ID indication table.

Figure 15:
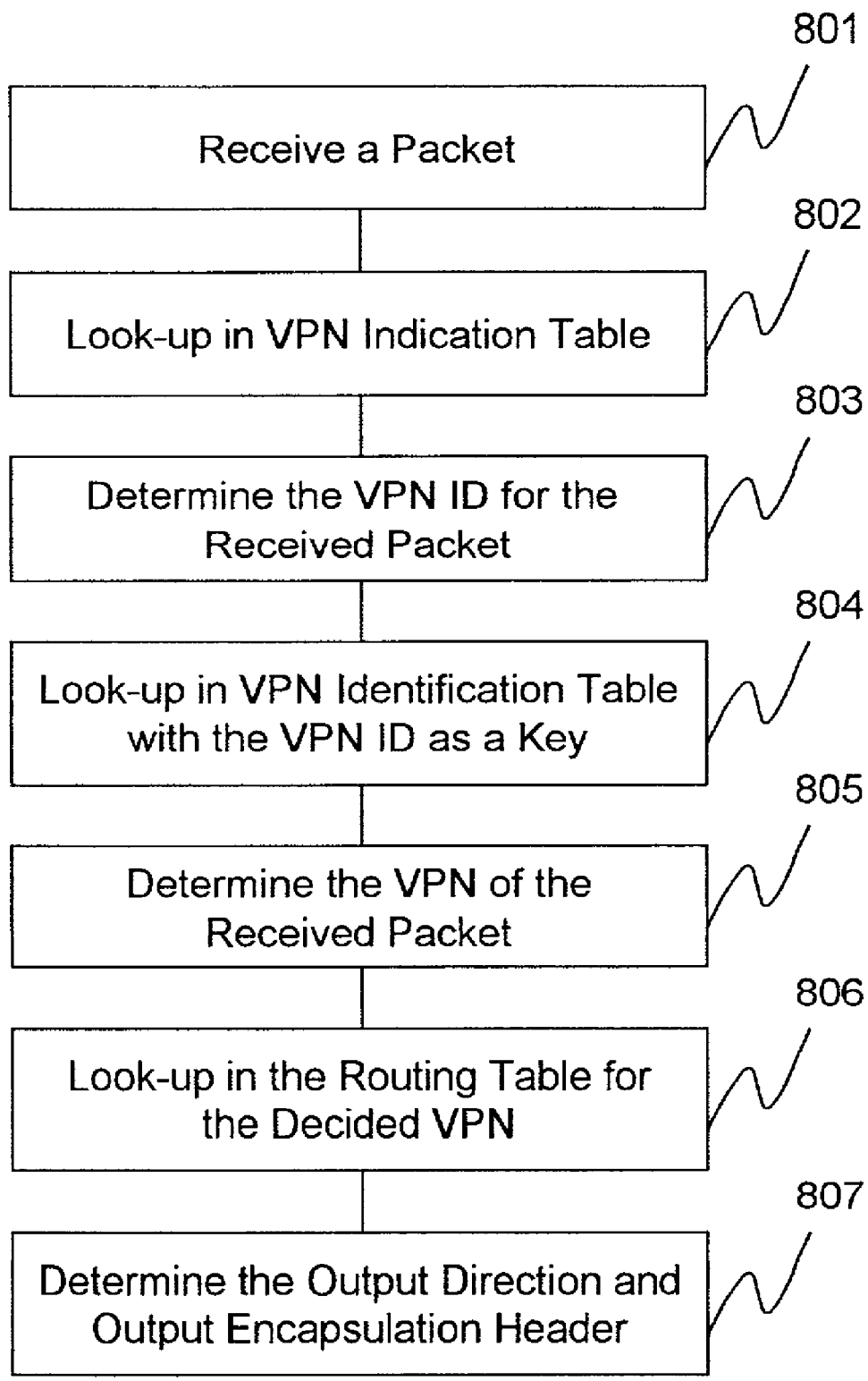
FIG. 15 illustrates a general operation flow of the VPN edge router offered by the present invention.

How the VPN edge router of the present invention operates was explained above with reference to FIGS. 1 to 14. As the summary of the above description, FIG. 15 illustrates a general operation flow of the router.

When the VPN edge router receives a packet in which an IP packet is encapsulated by a network-specific protocol from a LAN (step 801), it looks up for VPN ID in the VPN ID indication table (step 802) and determines a VPN ID of the received packet (step 803). Logical channel identifiers such as "VPI, VCI" values are generally used as VPN IDs, whereas combinations of one of these identifiers and physical interface numbers may be used as VPN IDs, depending on the lower layer protocols for VPNs interconnected by the router. Then, the router looks up for VPN in the VPN identification table, using the determined VPN ID as the search key (step 804) and determines a VPN across which the received packet passes (step 805). If the VPN ID is, for example, "VPI, VCI," the VPN identification table is searched for a match of the search key of the value of "VPI, VCI" assigned to the received packet and thereby the VPN across which the packet passed is determined. Finally, the routing table for the thus determined VPN is looked up (step 806) and an output route and an output capsule header are determined (step 807).

By using the router of the present invention, VPNs are identified by identifiers assigned to multiplex logical channels terminated to a physical interface. Thus, the number of VPNs to be interconnected by the router can be increased without increasing the physical lines.

Even if the router interconnects a plurality of LANs running under different lower layer protocols below IP, VPN IDs proper for the protocols can be registered with the router so that the router can identify VPNs.

While the invention has been particularly shown and described with reference to preferred embodiments thereof, it will be understood by those skilled in the art that the foregoing and other changes in form and details can be made therein without departing from the spirit and scope of the invention.

What is claimed is:

1. A router connected a core network, a first local area network (LAN) belonging to a first virtual private network (VPN), a second LAN belonging to a second VPN, a third LAN belonging to a third VPN and a fourth LAN belonging to a fourth VPN, comprising:

a memory;

a first interface for accommodating a first line connected to the first LAN and the second LAN, and for receiving multiplexed IP packets from the first and the second LANs via the first line, the IP packets from the first and the second LANs being encapsulated by a first protocol;

a second interface for connected to the core network;

means for identifying which of the first VPN and the second VPN to which an IP packet received at the first interface belongs by header information of the first protocol; and means for registering, in the memory, header information of the first protocol as a VPN identifier for identifying which of the first VPN and the second VPN to which an IP packet received from the first line belongs, wherein IP packets from the third and the fourth LANs being encapsulated by a second protocol different from the first protocol.

2. A router according to claim 1, further comprising:

a first routing table for the first VPN, the first routing table mapping each IP addresses used in the first VPN to each of capsule headers used in the core network;

a second routing table for the second VPN, the second routing table mapping each IP addresses used in the second VPN to each of capsule headers used in the core network; and a processing unit for adding an capsule header used in the core network to an IP packet belonging to the first VPN by referring the first routing table.

3. A router according to claim 1, wherein the first protocol is an asynchronous transfer mode protocol and the header information is expressed in combined VPI and VCI values; and wherein the second protocol is a Point-to-point Protocol (PPP) over a Synchronous Optical Network (SONET).

4. A method of setting up a router connected to a core network, a first local area network (LAN) belonging to a first virtual private network (VPN), a second LAN belonging to a second VPN, a third LAN belonging to a third VPN and a fourth LAN belonging to a fourth VPN, wherein the router receives multiplexed IP packets from the first and the second LANs via a first line, the IP packets from the first and the second LANs being encapsulated by a firt protocol, receives IP packets from the third LAN via a second line and IP packets form the fourth LAN via a third line, the IP packets from the third and the fourth LANs being encapsulated by a second protocol different from the first protocol and has a memory, the method comprising the steps of:

registering header information of the first protocol as a VPN identifier for identifying which of the first VPN and the second VPN to which an IP packet received from the first line belongs to the memory;

registering physical interface numbers assigned to interface between the router and the second line and interface between the router and the third line as a VPN identifier for identifying which of the third VPN and the forth VPN to which an IP packet received either the second line or the third line belongs.

5. A method of setting up a router according to claim 4, further comprising the step registering to the memory:

a first routing table for the first VPN, the first routing table mapping each IP addresses used in the first VPN to each of capsule headers used in the core network, each of the capsule headers is adding to an IP packet from the first line having the corresponding IP address;

a second routing table for the second VPN, the second routing table mapping each IP addresses used in the second VPN to each of capsule headers used in the core network, each of the capsule headers is adding to an IP packet from the first line having the corresponding IP address;

a third routing table for the third VPN, the third routing table mapping each IP addresses used in the third VPN to each of capsule headers used in the core network, each of the capsule headers is adding to an IP packet from the second line having the corresponding IP address;

a fourth routing table for the fourth VPN, the fourth routing table mapping each IP addresses used in the fourth VPN to each of capsule headers used in the core network, each of the capsule headers is adding to an IP packet from the third line having the corresponding IP address.

6. A method of setting up a router according to claim 4, wherein the first protocol is an asynchronous transfer mode protocol and the header information is expressed in combined VPI and VCI; and wherein the second protocol is a Point-to-point Protocol (PPP) over a Synchronous Optical Network (SONET).

7. A method of setting up a router connected to a core network, a first local area network (LAN) belonging to a first virtual private network (VPN), a second LAN belonging to a second VPN, a third LAN belonging to a third VPN and a fourth LAN belonging to a fourth VPN, wherein the router receives multiplexed IP packets from the first and the second LANs via a first line, the IP packets from the first and the second LANs being encapsulated by a first protocol, the IP packets from the third and the fourth LANs being encapsulated by a second protocol different from the first protocol and has a memory, the method comprising the step of:

registering, in the memory, header information of the first protocol as a VPN identifier for identifying which of the first VPN and the second VPN to which an IP packet received from the first line belongs.

8. A method of setting up a router according to claim 7, further comprising the steps of:

registering, to the memory, a first routing table for the first VPN, the first routing table mapping each IP addresses used in the first VPN to each of capsule headers used in the core network, each of the capsule headers is adding to an IP packet from the first line having the corresponding IP address; and registering, to the memory, a second routing table for the second VPN, the second routing table mapping each IP addresses used in the second VPN to each of capsule headers used in the core network, each of the capsule headers is adding to an IP packet from the first line having the corresponding IP address.

9. A method of setting up a router according to claim 7, wherein the first protocol is an Asynchronous Transfer Mode (ATM) protocol and the header information is expressed in combined VPI and VCI; and wherein the second protocol is a Point-to-point Protocol (PPP) over a Synchronous Optical Network (SONET).

10. A router connected to a core network, a first Local Area Network (LAN) belonging to a first Virtual Private Network (VPN), a second LAN belonging to a second VPN, a third LAN belonging to a third VPN, and a fourth LAN belonging to a fourth VPN, comprising:

means for receiving IP packets from the first and the second LANs being encapsulated by a first protocol;

a first interface connected to the core network;

a second interface for accommodating a first line connected to the third LAN and a second line connected to the fourth LAN, and for receiving IP packets from the third LAN via the first line and the IP packets from the fourth LAN via the second line, the IP packets from the third and the fourth LANs being encapsulated by a second protocol different from the first protocol;

means for identifying which of the third VPN and the fourth VPN to which an IP packet received at the second interface belongs by physical interface numbers assigned to interface between the second interface and the first line and interface between the second interface and the second line; and means for registering physical interface numbers assigned to interface between the second interface and the first line and interface between the second interface and the second line as a VPN identifier for identifying which of the third VPN and the fourth VPN to which an IP packet received either the first line or the second line belongs.

11. A router according to claim 10, further comprising:

a first routing table for the third VPN, the first routing table mapping each IP addresses used in the third VPN to each of capsule headers used in the core network;

a second routing table for the fourth VPN, the second routing table mapping each IP addresses used in the fourth VPN to each of capsule headers used in the core network; and a processing unit for adding a capsule header used in the core network to an IP packet belonging to the third VPN by referring the first routing table and adding a capsule header used in the core network to an IP packet belonging to the fourth VPN by referring the second routing table.

12. A router according to claim 10, wherein the first protocol is an Asynchronous Transfer Mode (ATM) protocol and the header information is expressed in combined VPI and VCI values, and wherein the second protocol is a Point-to-point Protocol (PPP) over a Synchronous Optical Network (SONET).

13. A method of setting up a router connected to a core network, a first Local Area Network (LAN) belonging to a first Virtual Private Network (VPN), a second LAN belonging to a second VPN, a third LAN belonging to a third VPN and a fourth LAN belonging to a fourth VPN, said router having a memory, said method comprising the steps of:

receiving IP packets from the first and the second LANs being encapsulated by a first protocol, and receiving IP packets from the third LAN via a first line and IP packets from the fourth LAN via a second line, the IP packets from the third and the fourth LANs being encapsulated by a second protocol different from the first protocol; and registering physical interface numbers assigned to interface between the router and the first line and interface between the router and the second line as a VPN identifier for identifying which of the third VPN and the fourth VPN to which an IP packet received either the first line or the second line belongs.

14. A method of setting up a router according to claim 13, further comprising the steps:

registering, to the memory, a first routing table for the third VPN, the third routing table mapping each IP addresses used in the third VPN to each of capsule headers used in the core network, each of the capsule header is adding to an IP packet from the first lien having the corresponding IP address; and registering, to the memory, a second routing table for the fourth VPN, the second routing table mapping each IP addresses used in the fourth VPN to each of capsule header sued in the core network, each of the capsule headers is adding to an IP packet from the second line having the corresponding IP address.

15. A method of setting up a router according to claim 13, wherein the first protocol is an ATM protocol and the header information is expressed in combined VPI and VCI; and wherein the second protocol is a Point-to-point Protocol (PPP) over a Synchronous Optical Network (SONET).

* * * * *